United States Patent
Ladyzhenskii (10) Patent No.: US 7,613,158 B2
(45) Date of Patent: Nov. 3, 2009

(54) METHOD OF QUADRATURE SPREADING

(75) Inventor: Rudolf Ladyzhenskii, Oakleigh East (AU)

(73) Assignee: Indoaust Investments Ltd., Melbourne, Victoria (AU)

( * ) Notice: Subject to any disclaimer, the term of this patent is extended or adjusted under 35 U.S.C. 154(b) by 716 days.

(21) Appl. No.: 10/450,722

(22) PCT Filed: Oct. 29, 2001

(86) PCT No.: PCT/AU01/01387

§ 371 (c)(1),
(2), (4) Date: Nov. 17, 2003

(87) PCT Pub. No.: WO02/49228

PCT Pub. Date: Jun. 20, 2002

(65) Prior Publication Data

US 2004/0091020 A1    May 13, 2004

(30) Foreign Application Priority Data

Dec. 13, 2000    (AU)    ..................... PR2063

(51) Int. Cl.
*H04B 7/216*    (2006.01)
*H04B 1/00*    (2006.01)

(52) U.S. Cl. .............. 370/342; 370/320; 370/335; 375/141; 375/146; 375/147; 375/148; 375/150

(58) Field of Classification Search ................. 370/352, 370/208, 335, 342, 329, 282, 318, 320; 380/35; 375/150, 130, 141, 151, 146, 147, 148; 455/101, 455/450, 522, 509, 517
See application file for complete search history.

(56) References Cited

U.S. PATENT DOCUMENTS

| | | | | |
|---|---|---|---|---|
| 5,712,869 A * | 1/1998 | Lee et al. | ..................... | 375/141 |
| 6,219,374 B1 * | 4/2001 | Kim et al. | ................... | 375/130 |
| 6,389,138 B1 * | 5/2002 | Li et al. | ......................... | 380/35 |
| 6,603,804 B1 * | 8/2003 | Khoini-Poorfard et al. | .. | 375/152 |
| 6,639,937 B2 * | 10/2003 | Doetsch et al. | ............ | 375/130 |
| 6,804,217 B1 * | 10/2004 | Miyatani et al. | ............ | 370/335 |
| 7,003,021 B2 * | 2/2006 | Gilhousen et al. | ........... | 375/150 |
| 7,006,428 B2 * | 2/2006 | Proctor et al. | ............... | 370/208 |
| 2002/0105929 A1 * | 8/2002 | Chen et al. | .................. | 370/335 |

FOREIGN PATENT DOCUMENTS

| EP | 0 783 210 | 7/1997 |
|---|---|---|
| EP | 0 854 586 | 7/1998 |
| JP | 2000-236285 | 8/2000 |

* cited by examiner

*Primary Examiner*—Thjuan K Addy
(74) *Attorney, Agent, or Firm*—Merchant & Gould P.C.

(57) ABSTRACT

The invention provides a method of quadrature spreading suited for use in a software implementation of a code division multiple access communication (CDMA) system. The method includes providing for a bit of short code, adding a bit of each of N data channels together to obtain a combined channel value ($X_{in}$), and performing a spreading operation to obtain a spread channel value.

8 Claims, 6 Drawing Sheets

METHOD OF QUADRATURE SPREADING

FIELD OF THE INVENTION

The present invention relates generally to cellular telecommunications and more specifically to a technique for quadrature spreading of data in the transmit section of the forward channel of a code division multiple access (CDMA) communication system.

BACKGROUND TO THE INVENTION

CDMA systems and protocols are specified in Interim-Standard ninety-five (IS-95) by the US Telecommunications Industry Association and CDMA2000 RC1.

The link between a mobile station and a base station is made up of two channels, the forward channel (from the base station to the mobile station) and the reverse channel (from the mobile station to the base station.

The forward channel is composed of four different types of code channels: a pilot channel, sync channel, paging channels and forward traffic channels.

A typical forward CDMA channel consists of 64 code channels. The 64 code channels generally consists of a pilot channel, one sync channel, seven paging channels and 55 forward traffic channels.

The pilot channel is an unmodulated, direct-sequence spread spectrum signal that is transmitted at all times by the base station on every active forward channel. The mobile station monitors the pilot channel to acquire the timing of the forward CDMA channel and to obtain a phase reference for coherent demodulation.

The sync channel is used to transport synchronisation messages to mobile stations within a CDMA cell. It is used by the mobile station to acquire initial time synchronisation.

The paging channel is used to transmit control information and pages to mobile stations residing in the CDMA cell.

The forward traffic channel is used for transmission of user and signalling traffic from the base station to a specific mobile station during a phone cell.

All of the code channels in the forward CDMA channel are orthogonally spread by an appropriate Walsh function and then undergo quadrature spreading (the sync channel, paging channel and forward traffic channel also undergo several other processes before being orthogonally spread).

The forward CDMA channels are orthogonally spread using Walsh Functions at a fixed chip rate of 1.2288 Mcps. The purpose of orthogonal spreading is to provide orthogonal channelization among all code channels. The pilot channel is always spread with Walsh code 0, the SYNC channel is always spread with Walsh code 32 and the paging channels are assigned Walsh codes 1 through 7.

Following Walsh spreading, all code channels undergo Quadrature Spreading, which involves performing the modulo-2 addition of the orthogonally spread data with the pseudo noise (PN) sequence generated by the short code generator. The output of the quadrature spreader is in the form of In-Phase (I) and Quadrature (Q) channels.

The I and Q data streams (channels) are then each passed through a Baseband Filter which shapes the waveform to meet required bandwidth constraints as well as minimize Inter Symbol Interference (ISI).

The I and Q channels are then modulated using Quadrature Phase Shift keying (QPSK). This is done in the I channel by amplitude modulating the cosine function with an amplitude of binary 0's and 1's to produce a BPSK (Binary Phase Shift Keying) waveform. In the Q channel, the sine function is modulated producing an orthogonal BPSK waveform. The summation of the BPSK waveforms then yields the QPSK waveform.

In conventional systems all channels are subjected to quadrature spreading separately.

To the applicant's knowledge all existing CDMA systems are implemented as hardware. Recently, it has been proposed that existing cellular telecommunications hardware could be replaced by a software implemented radio telecommunication system. It will be appreciated that software-implementations will benefit from an efficient technique for spreading the channels with the short code and that there will be benefits if the processing load is reduced.

SUMMARY OF THE INVENTION

Accordingly, the invention provides a method of quadrature spreading in a code division multiple access communication (CDMA) system including the steps of:

providing a bit of short code;

adding a bit of each of N data channels together to obtain a combined channel value ($X_{in}$); and performing a spreading operation:

$$X_{out} = \begin{cases} X_{in} & \text{if the bit } f \text{ short code} = 0 \\ N - X_{in} & \text{if the bit } f \text{ short code} = 1 \end{cases}$$

to obtain a spread channel value.

Thus, the channels are combined before the spreading option is performed.

Preferably, each combined channel value is represented using K bits and S combined channel values are combined together to form combined channel data having M bits, and said method involves performing said spreading operation on said combined channel data to obtain spread channel data containing S spread channel values.

Preferably, said spreading operation is performed by:

providing S bits of short code;

extending each bit of short code to have K identical bits and combining the S extended bits of short code to form short code data having M bits;

providing constant data having M bits in which a binary sequence representing the number of channels N is repeated S times;

performing a first manipulation of said combined channel data by logically AND-ing said combined channel data with the inverse of said short code data to thereby obtain first manipulated combined channel data;

performing a second manipulation of said combined channel data by (a) subtracting said combined channel data from said constant data to obtain intermediate data, and (b) logically AND-ing said intermediate data with said short code data to thereby obtain second manipulated combined channel data; and logically OR-ing said first and second manipulated combined channel data to obtain said spread channel data.

Preferably, K is the smallest number of bits required to represent a maximum possible combined channel value which also divides evenly into M.

Preferably, M is the native number of bits of a processor used to carry out the method.

Thus, if a 32-bit processor is used to carry out the method and the combined channel data has 32 bits, and there are 4-15 channels, four bits will be used to represent each combined channel value and there will be eight combined channel values in the combined channel data. If there are 16-255 channels, each eight bits will be used to represent each combined channel value and there will be four combined channel values in the combined channel data. It will be appreciated that a larger number of bits can be used to represent each combined channel value than is necessary—eg 8-bits for 0-15 channels—however, this will reduce computational efficiency.

The invention also provides a processor programmed to carry out the above method.

Preferably, the processor is a digital signal processor (DSP).

Preferably, the DSP is a 32-bit DSP.

BRIEF DESCRIPTION OF THE DRAWINGS

An example of a preferred embodiment of the invention will now be described in relation to the accompanying drawings in which.

DESCRIPTION OF THE PREFERRED EMBODIMENT

In a CDMA system the link between a mobile station and a base station is made up of two channels, the forward channel (from the base station to the mobile station) and the reverse channel (from the mobile station to the base station).

The preferred embodiment relates to the transmit section of the forward channel. A description of a forward CDMA channel will now be given.

Figure 1A:
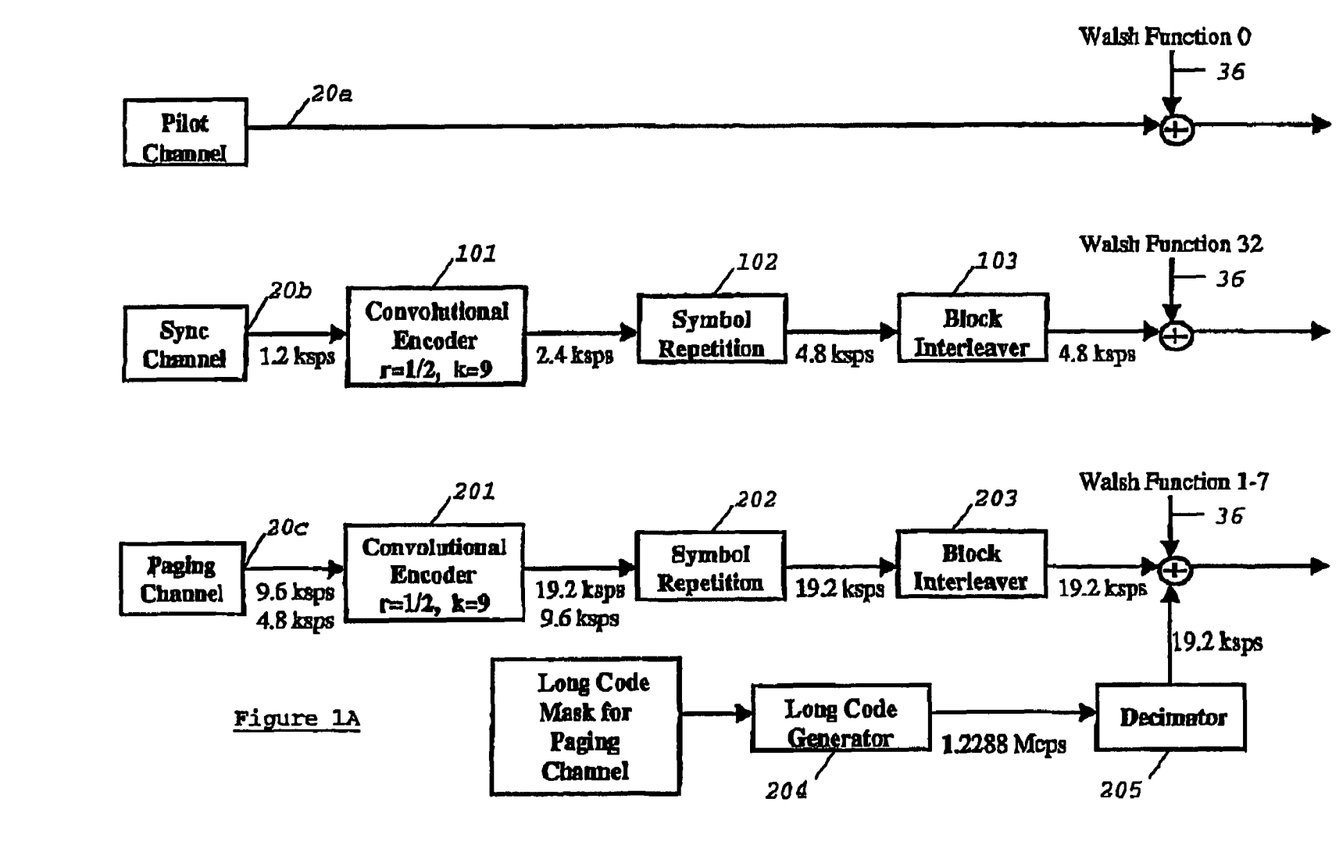
FIGS. 1A, 1B and 1C, illustrate the forward CDMA channel structure.
Figure 1B:
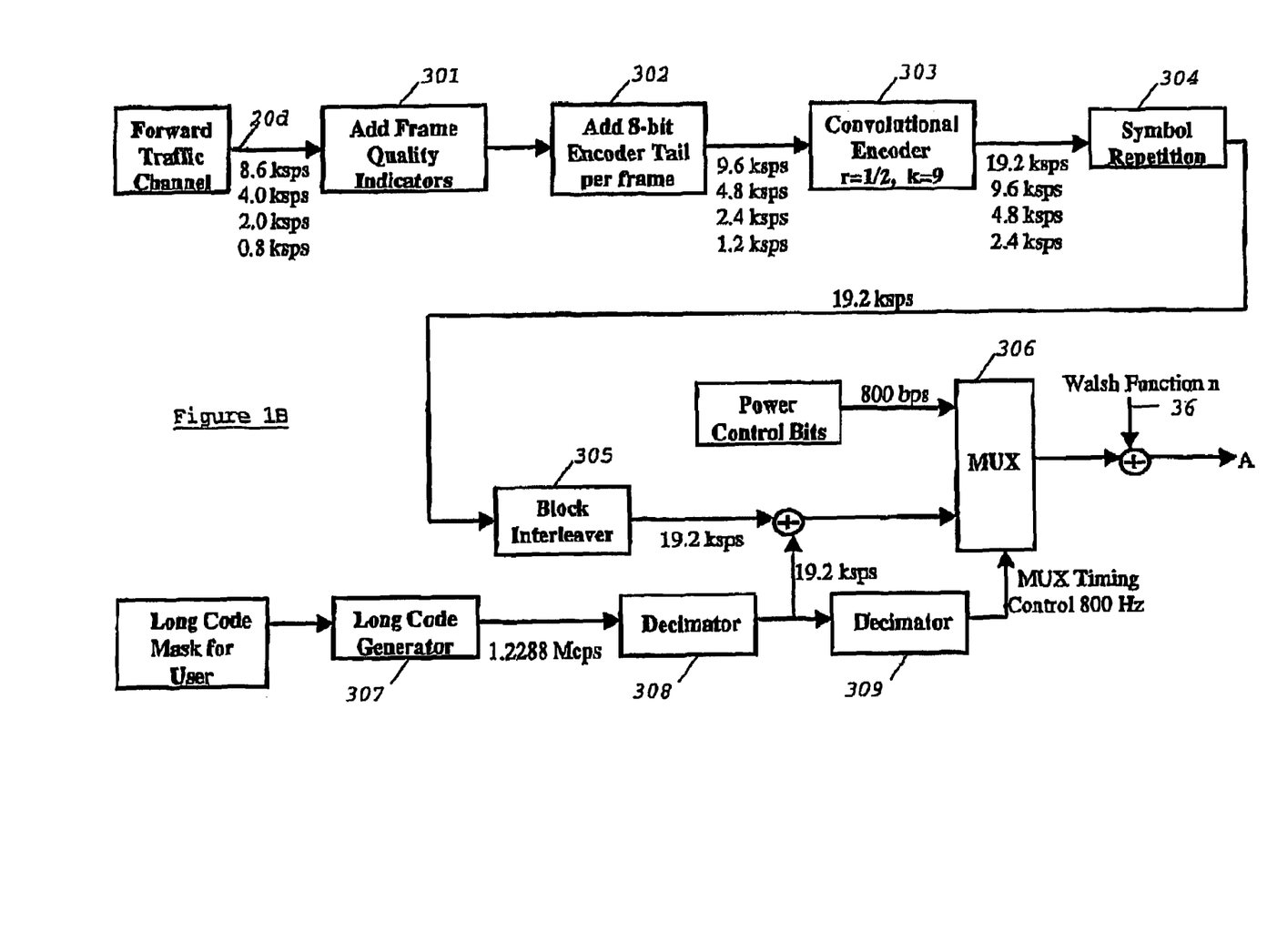
Figure 1C:
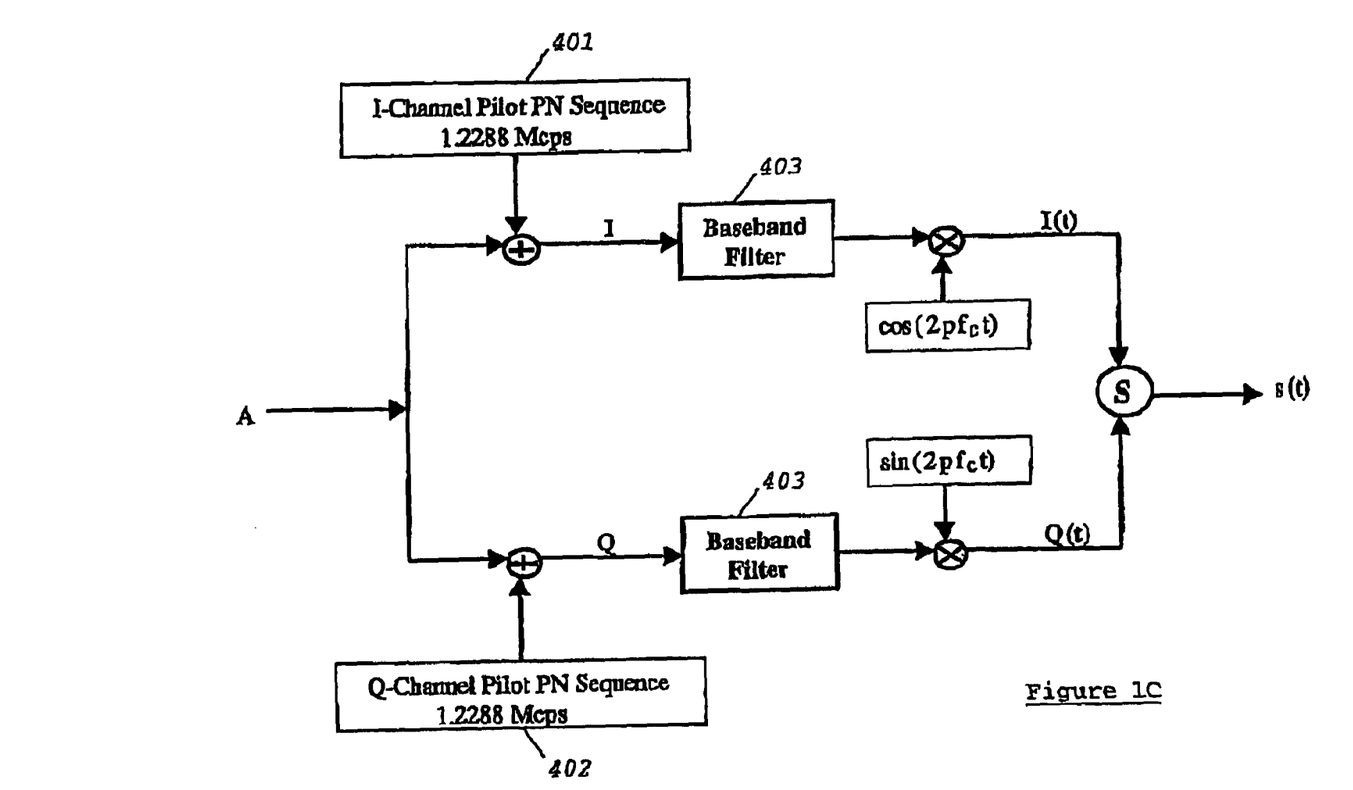

FIGS. 1A, 1B and 1C illustrate the forward CDMA channel structure of the prior art. The preferred embodiment relates to a modification of this forward channel structure as it specifically relates to a method which allows quadrature spreading to be efficiently performed in software.

As the Figures show, the forward channel is composed of four different types of code channels: a pilot channel 20a, sync channel 20b, paging channels 20c and forward traffic channels 20d.

A typical forward CDMA channel consists of 64 code channels that are available for use. The 64 code channels are generally comprised of a pilot channel, a sync channel, seven paging channels and fifty-five forward traffic channels.

The pilot channel 20a is an unmodulated, direct-sequence spread spectrum signal that is transmitted at all times by the base station on every active forward channel. The mobile station monitors the pilot channel to acquire the timing of the forward CDMA channel and provides a phase reference for coherent demodulation.

The sync channel 20b is used to transport synchronization messages to mobile stations within the CDMA cell. It is used by the mobile station to acquire initial time synchronization.

The paging channels 20c are used to transmit control information and pages to mobile stations residing in the CDMA cell.

The forward traffic channels 20d are used for transmission of user and signaling traffic from the base station to a specific mobile station during a phone cell.

Referring to FIGS. 1A and 1B, all of the code channels 20a-20d in the forward CDMA channel are orthogonally spread by the appropriate Walsh function 36 before they undergo quadrature spreading. However, as known to persons skilled in the art, the sync channel, paging channel and forward traffic channel undergo several other processes which will now be described.

The sync, paging and traffic channels all undergo convolutional encoding using a convolutional encoder 101, 201, 303. This process protects the system from errors that can occur at the high data rates used in CDMA. In convolutional encoding, the channel data streams are divided into smaller blocks of length k and are then encoded into code word symbols of length n. The (n, k, m) convolutional code is implemented where k is the input, n is the output and m is memory order. The rate of the encoder is then defined by the code rate R=k/n. The sync, paging and traffic channels all use an encoder with a code rate R=½.

Symbol repetition 102, 202, 304 is also used by all channels except the pilot channel. The function of this process is to increase the data rate to the level used by the Block Interleaver 103, 203, 305, which is 19200 sps (symbols per second) or 19.2 ksps. For example, the data rate on the sync channel after convolutional encoding is 2.4 ksps. This value is increased 8 times to 19.2 Ksps by repeating each convolutionally encoded symbol 7 times. A 9.6 ksps stream however (such as the one in the paging channel), would only need to be repeated once to produce a 19.2 ksps stream.

Block interleaving 103, 203, and 305 is performed in order to reorder a sequence of symbols and is performed to achieve time diversity and improve performance.

Long code generation is performed in the paging and traffic channels by long code generator 204, 307. The Long Code Generator produces long codes, which are 42 bit pseudo-noise (PN) sequences that are used for scrambling on the forward CDMA channel and this produces limited privacy.

The Long Code Generator produces $2^{42}-1$ combinations of different long code and each long code uniquely identifies a mobile station on both the forward traffic channel and reverse traffic channel. The long code is characterized by the long code mask that is used to form either the public long code or the private long code.

The output of the Long Code Generator is fed through a Decimator 205, 308. The Decimator reduces the size of the long code by taking 1 out of every 64 bits. This has the result of reducing the data rate from 1228800 cps (chips per second) or 1.2288 Mcps to 19.2 ksps.

As mentioned above, after the above-described processes have been performed on the relevant channels, all the code channels on the forward CDMA channel are orthogonally spread using Walsh Functions at a fixed chip rate of 1.2288 Mops. This provides orthogonal channelization among all code channels. The pilot channel is always spread with Walsh code 0, the sync channel is always spread with Walsh channel 32 and the paging channels are assigned code channels 1 through 7.

As shown in FIG. 1C, in the prior art, following Walsh spreading, all code channels undergo quadrature spreading, which involves performing the modulo-2 addition of the orthogonally spread data of each code channel with a PN sequence generated by the short code generator. The output of the quadrature spreader is in the form of In-Phase (I) and Quadrature (Q) channels 401, 402.

The I and Q data streams (channels) are then each passed through a Baseband Filter 403 which shapes the waveform to meet required bandwidth constraints as well as minimize inter symbol interference (ISI).

After the required filtering, the I and Q channels are modulated using Quadrature Phase Shift keying (QPSK). This is done in the I channel by amplitude modulating the cosine function with an amplitude of binary 0's and 1's to produce a BPSK (Binary Phase Shift Keying) waveform. In the Q channel, the sine function is modulated producing an orthogonal BPSK waveform. The summation of the BPSK waveforms then yields the QPSK waveform which is transmitted on the forward channel.

The preferred embodiment departs from the prior art by combining N data channels before performing quadrature spreading.

Figure 2:
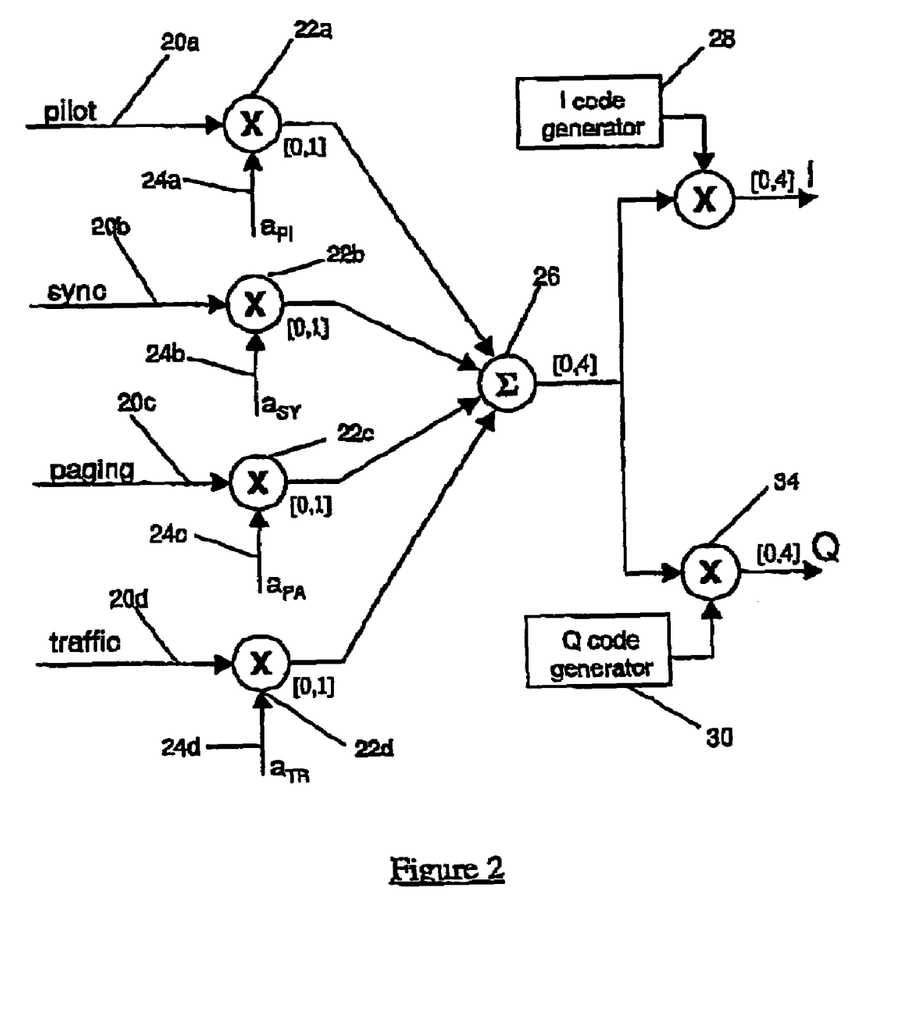
FIG. 2 is a schematic diagram showing quadrature spreading of 4-channels using the technique of the preferred embodiment.

The preferred embodiment will be explained in relation to an example in which four channels are combined (i.e. N=4), however the technique can be applied to a larger number of channels—for example, the IS-95 specification of sixty-four channels per cell. Each channel 20, may be turned off if channel control signal 24 is set to zero. The channels 20 will be on when the channel control signal 24 is set to one.

The preferred embodiment, bits of channels 20a to 20d are summed to provide a binary combined channel value in the range of zero to four (represented in binary). These combined values are then spread in quadrature by the I and Q short code generators 28 and 30.

I and Q code generators 28, 30 are shown in FIG. 2 which provide short code values for quadrature spreading. The short code generation of IS-95 are based on the polynomials: $Px(x)=x^{15}+x^{15}+x^9+x^8+x^7+x^5+1$ for the I channel, and $Pq(x)=x^{15}+x^{12}+x^{11}+x^{10}+x^6+x^5 \, x^4+x^3+1$ for Q-channel. To generate the short code 15 bit shift registers are used for each of the P and Q code generators. These can be implemented in software as 16-bit or 32-bit entities. As IS-95 requires short codes to be of the length $2^{15}$, a counter is used to insert a zero after every fourteen consecutive zero's.

To spread the signal in quadrature, every symbol of the combined channel value is exclusive OR-ed (XOR-ed) with a bit from the short code generator. Separate XOR operations are performed on the combined channel value for each of the I and Q components using the respective short PN codes. In this respect, a special XOR operation is performed where: $X_{out}=X_{in}\otimes PN$ That is:

$$X_{out} = \begin{cases} X_{in} & \text{if the bit of short code} = 0 \\ N - X_{in} & \text{if the bit of short code} = 1 \end{cases}$$

where N=the number of channels (Equation 1).

In the preferred embodiment, the method of the present invention is implemented using processors in the form of digital signal processors (DSPs). In the preferred embodiment, a 32-bit DSP architecture is employed, however it will be apparent to those skilled in the art that DSPs capable of handling different bit lengths can be employed as appropriate, and the technique of the present invention can be adapted to the native number of bits of the processor being used.

It will be appreciated that when the channels are combined at point 26 of FIG. 2, the combined channel value will need to be represented using sufficient bits to allow the maximum possible combined channel value to be represented. For example, for 4 channels which can produce a maximum binary value of 100, 3-bits will be required. However, given that 32-bit DSP architecture is suited to the processing of 32-bit data, to achieve computational efficiency, it is desirable to pack multiple combined channel values into a single 32-bit data entity and to carry out the spreading operation on all of the combined channel values simultaneously. To do so, it is desirable to represent each combined channel value with a number of bits which divides equally into the number of bits of the data entity being used to store the combined channel values which are to be processed at the same time. Therefore, for a 32-bit DSP, eight combined channel values of 4-bits each are combined to form 32-bit combined channel data. As a general rule where N data channels are combined and an M-bit processor is used, K bits are used to represent each combined channel value, where K is the smallest number of bits required to represent N in binary which also divides evenly into M. Hence, S+K-bit combined channel values will be packed into each M-bit combined channel data.

Packing a number of data segments into the 32-bit value has the potential to create undesirable computational complexity—i.e. potentially, groups of K-bits corresponding to each combined channel value would need to be extracted, the XOR operation performed on each combined channel value and then steps repeated for the other seven combined channel values. This procedure would be computationally intensive with multiple conditional operations and would not be suitable for a digital signal processor implementation.

The above described special XOR operation, together with special treatment of the short code, allows operations to be carried out on all 32-bits at one time.

In a four channel example, all values of $X_{in}$ will be in the range of 0-4 and hence all values of $X_{out}$ will also be in the range 0-4. Then, as each combined channel value should be logically XOR-ed with the same shout code value, the short code is extended to the same number of bits as are used to represent each combined channel value. Thus, in the four channel example, 8-bits of short code are extended to occupy 32-bits. As shown in FIG. 2, the initial value of the shift register which stores the short code is obtained at step 50. The register is than shifted eight times at step 52 to produce 8 bits of short code which is extended to 32-bits by extending each bit to occupy 4 bits. For example, the eight bits of short code 10010101 are extended to the 32-bit value 1111 0000 0000 1111 0000 1111 0000 1111.

Figure 3:
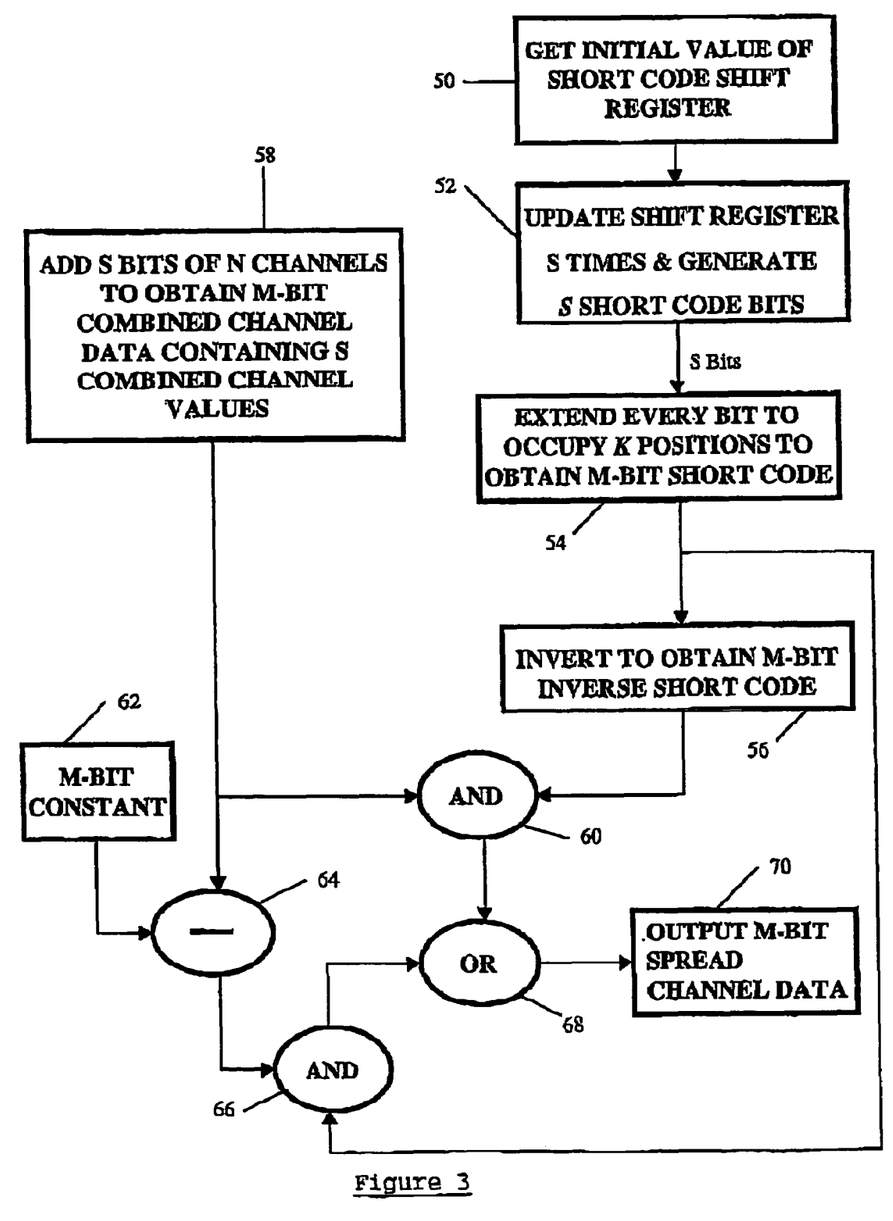
FIG. 3 is a flow chart showing the method of the preferred embodiment.

To carry out Equation 1, the channel values need to be manipulated separately for the short code values 0 and 1 and the results combined to produce the appropriate output. To this end, two manipulations of the combined channel data are performed and the first and second manipulated combined channel data are then combined using a logical OR operation at step 68 to produce output data in the form of 32-bit channel data at step 70.

The first manipulation is performed by inverting the short code data at step 56 and, at step 60, logically AND-ing the inverted short code data with the combined channel data produced at step 58. This produces first manipulated combined channel data.

The second manipulation is performed by subtracting, at step 64, the combined channel data obtained at step 58 from a 32-bit constant provide at step 62 to obtain intermediate data. For the four channel case, the constant consists of eight repetitions of the binary sequence 0100 (i.e. four in binary). Then, at step 66, the intermediate data is logically AND-ed with the short code data to produce second manipulated combined channel data.

The method will be described further in relation to the following example. However, it will be appreciated that the quadrature spreading will be performed separately for each of the I and Q channels.

EXAMPLE 1

Assume 8 bits of each of 4 channels have been combined to form combined channels data:

0001 0011 0000 0011 0010 0000 0010 0011

Assume 8 bits of short code have been extended to form short code data:

1111 0000 0000 1111 0000 1111 0000 1111

Then inverse of the short code date is:

0000 1111 1111 0000 1111 0000 1111 0000

Step 1

AND-ing combined channel data with inverse of short code will produce first manipulated channel data:

0000 0011 0000 0000 0010 0000 0010 0000

This result is saved.

Step 2.
Create binary constant 0x44444444

0100 0100 0100 0100 0100 0100 0100 0100

Subtracting combined channel data from this constant gives intermediate data;

0011 0001 0100 0001 0010 0100 0010 0001

Step 3.
AND-ing the result of step 2 with short code will produce second manipulated data:

0011 0000 0000 0001 0000 0100 0000 0001

Note that every bit corresponding to the short code 0 now has 0 in it.

Step 4.
Combine second manipulated channel data obtained at step 3 with first manipulated channel data obtained at Step 1. (OR operation)

0011 0011 0000 0001 0010 0100 0010 0001

It will be apparent to persons skilled in the art that, if there are more than fifteen channels and up to the sixty-four channels required by IS-95, that it will be necessary to represent combined channel values with (8-bits), thus four data segments will be in each piece of combined channel data on which the above operation is performed. Further, 4-bits of short code will need to be extended to occupy the 32 bits.

Figure 4:
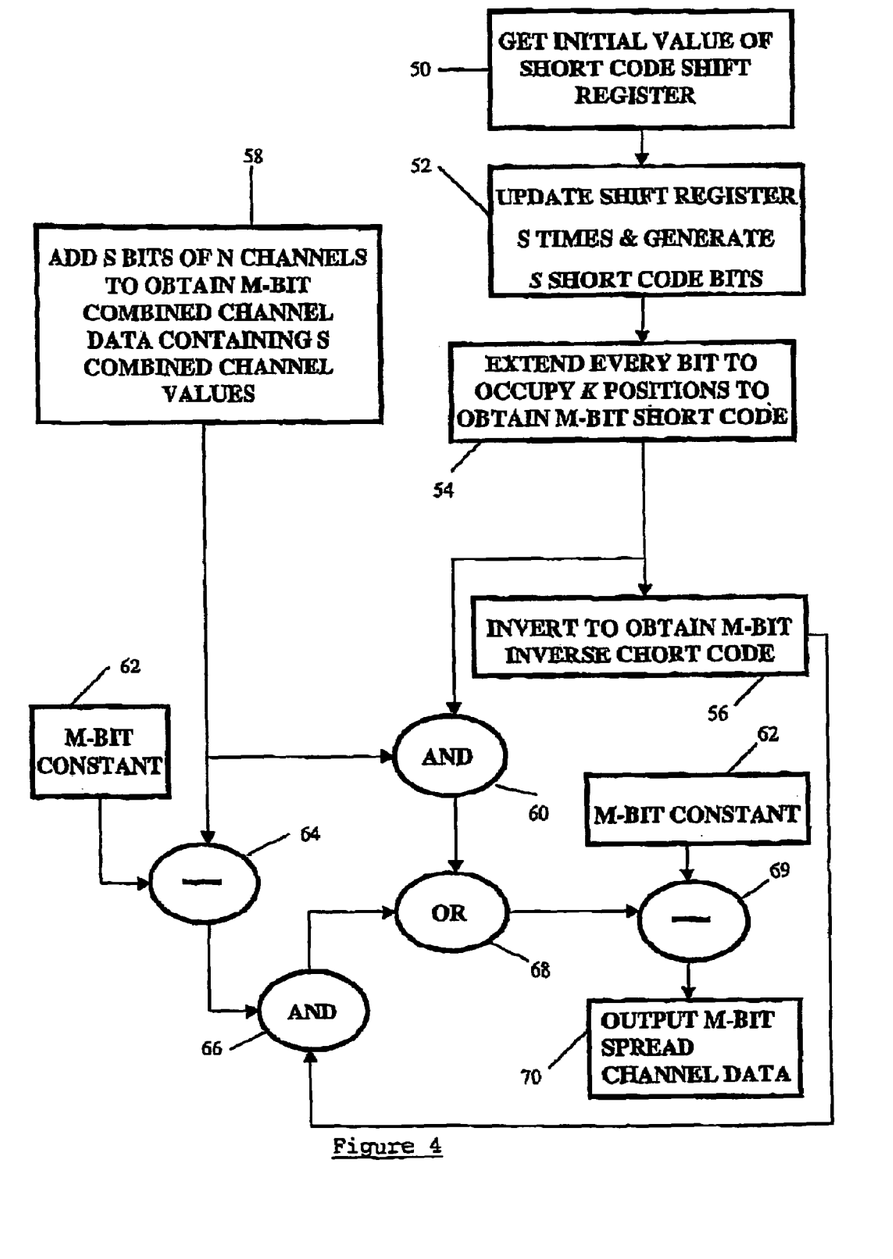
FIG. 4 is a flow chart showing an alternative to the method of FIG. 3.

FIG. 4 shows an alternative technique for carrying out the method of illustrating FIG. 3.

In the embodiment illustrated in FIG. 4, the first manipulation is performed by logically AND-ing the short code data with the combined channel data at step 60 instead of with the inverted short code data. As a result of this change, the second manipulation is performed with the inverse short code data and it is necessary to make a correction after step 68 in order to obtain the correct output spread channel data at step 70. This is achieved at step 69 by subtracting the result of step 68 from the M-bit constant provided at step 62.

It will be apparent that skilled programmers can generate an appropriate computer program for implementing the method of the invention. The invention includes within its scope such a program and a processor, such a DSP, so programmed.

Various modifications to the foregoing system will be apparent to persons skilled in the art and should be considered a falling within the scope of the present invention.

The claims defining the invention are as follows:

1. A method of quadrature spreading by an M bit processor in a code division multiple access communication (CDMA) system, the method comprising:
    adding a bit of each of N data channels together to obtain a combined channel value represented by K bits where K is the smallest number of bits which is required to represent N in binary and which is a factor of M;
    packing S combined channel values into an M bit combined channel data element, where S×K=M;
    extending M/N bits of short code to M bits by repeating each bit of short code N times to produce an extended short code; and
    XORing the combined channel data element with the extended short code to obtain an N channel M bit spread channel value, wherein the XORing comprises a spreading operation:

$$X_{out} = \begin{cases} X_{in} & \text{if the bit of short code} = 0 \\ N - X_{in} & \text{if the bit of short code} = 1 \end{cases}$$

and wherein said spreading operation is performed by:
    providing constant data having M bits in which a binary sequence representing the number of channels N is repeated S times;
    performing a first manipulation of said combined channel data by logically AND-ing said combined channel data with said short code data to thereby obtain first manipulated combined channel data;
    performing a second manipulation of said combined channel data by (a) subtracting said combined channel data from said constant data to obtain first intermediate data and (b) logically AND-ing said intermediate data with the inverse of said short code data to thereby obtain second manipulated combined channel data;
    logically OR-ing said first and second manipulated combined channel data; and subtracting said logically OR-ed first and second manipulated combined channel data from said constant data to obtain said spread channel data.

2. A method as claimed in claim 1, wherein said spreading operation is performed by:
    providing constant data having M bits in which a binary sequence representing the number of channels N is repeated S times;
    performing a first manipulation of said combined channel data by logically AND-ing said combined channel data with the inverse of said short code data to thereby obtain first manipulated combined channel data;
    performing a second manipulation of said combined channel data by (a) subtracting said combined channel data from said constant data to obtain intermediate data, and (b) logically AND-ing said intermediate data with said short code data to thereby obtain second manipulated combined channel data, and
    logically OR-ing said first and second manipulated combined channel data to obtain said spread channel data.

3. A method as claimed in claim 1 wherein N is 4.

4. A method as claimed in claim 1 wherein M is the native number of bits of a processor used to carry out a method.

5. A method as claimed in claim 4 where M is 32.

6. A processor programmed to carry out the method of claim 1.

7. A program which when executed by a processor will cause said processor to carry out the method of claim 1.

8. A program which when executed by a 32-bit digital signal processor will cause said 32-bit digital signal processor to carry out the method of claim 1 wherein M=32.

* * * * *